United States Patent
Ou et al.

(10) Patent No.: US 8,255,075 B2
(45) Date of Patent: Aug. 28, 2012

(54) THERMAL ERROR COMPENSATION METHOD FOR MACHINE TOOLS

(75) Inventors: Feng-Ming Ou, Taichung (TW); James Shih-Shyn Wu, Taichung (TW)

(73) Assignee: Industrial Technology Research Institute, Hsin-Chu (TW)

( * ) Notice: Subject to any disclaimer, the term of this patent is extended or adjusted under 35 U.S.C. 154(b) by 249 days.

(21) Appl. No.: 12/625,837

(22) Filed: Nov. 25, 2009

(65) Prior Publication Data

US 2010/0152881 A1 Jun. 17, 2010

(30) Foreign Application Priority Data

Dec. 11, 2008 (TW) ................. 97148145 A (51) Int. Cl.
*G05B 13/02* (2006.01)
*G06F 19/00* (2011.01)
*G05D 23/00* (2006.01)
*G01N 25/00* (2006.01)
*G01K 13/12* (2006.01)
(52) U.S. Cl. .......... 700/175; 700/29; 700/160; 700/299; 374/45; 374/100
(58) Field of Classification Search .............. 700/29, 700/54, 174–175, 160; 374/45, 100
See application file for complete search history.

(56) References Cited

U.S. PATENT DOCUMENTS

| 4,471,443 | A | 9/1984 | Kinoshita et al. |
| 4,919,575 | A | 4/1990 | Yoshimi et al. |
| 5,303,458 | A | 4/1994 | Sheehan et al. |
| 5,444,640 | A | 8/1995 | Hirai |
| 5,581,467 | A | 12/1996 | Yasuda |
| 5,619,414 | A | * | 4/1997 | Ishii ............................. 700/175 |
| 5,623,857 | A | 4/1997 | Sakuraba |
| 5,779,405 | A | 7/1998 | Aiso et al. |

(Continued)

FOREIGN PATENT DOCUMENTS

JP 2006065716 A 3/2006

(Continued)

OTHER PUBLICATIONS

Ramesh et al., Error compensation in machine tools—a review Part II: thermal errors, Int. Journal of Machine Tools & Manufacture (2000).*

(Continued)

*Primary Examiner* — Sean Shechtman
*Assistant Examiner* — Darrin Dunn
(74) *Attorney, Agent, or Firm* — Morris Manning & Martin LLP; Tim Tingkang Xia, Esq.

(57) ABSTRACT

A thermal error compensation method for machine tools is disclosed, which comprises the steps of: disposing at least a thermal sensor at positions neighboring to the at least one heat source of a machine tool; driving the machine tool to operate under a specific operation condition for enabling the at least one heat source to generate heat; generating a thermal signal according to the temperature detected by the at least one thermal sensor; using a heat conducting calculation unit to access the thermal signal and the information relating to the specific operation condition to be used in a calculation for obtaining and thus outputting at least a node temperature; and using an error compensation unit to access the at least one node temperature to be used in a calculation for obtaining thermal error compensation values for the machine tool.

8 Claims, 5 Drawing Sheets

U.S. PATENT DOCUMENTS

| | | | |
|---|---|---|---|
| 5,833,407 A | | 11/1998 | Senda |
| 5,895,181 A | * | 4/1999 | Ito et al. ............... 409/132 |
| 6,019,506 A | * | 2/2000 | Senda ..................... 374/55 |
| 6,167,634 B1 | * | 1/2001 | Pahk et al. .............. 33/702 |
| 6,269,284 B1 | * | 7/2001 | Lau et al. ............... 700/193 |
| 6,286,055 B1 | * | 9/2001 | Yamazaki et al. .......... 710/1 |
| 6,456,896 B1 | | 9/2002 | Ito et al. |
| 6,471,451 B2 | | 10/2002 | Kojima et al. |
| 6,532,608 B2 | | 3/2003 | Schreiner |
| 6,591,156 B1 | * | 7/2003 | Fukaya et al. ............ 700/159 |
| 6,651,019 B2 | | 11/2003 | Mizuguchi et al. |
| 7,245,983 B2 | * | 7/2007 | Suzuki et al. ............ 700/177 |
| 7,266,903 B2 | * | 9/2007 | Sato ..................... 33/702 |
| 7,354,386 B2 | | 4/2008 | Iefuji |
| 2002/0004688 A1 | * | 1/2002 | Kojima et al. ............ 700/193 |
| 2006/0221341 A1 | * | 10/2006 | Paul et al. .............. 356/406 |
| 2008/0215178 A1 | * | 9/2008 | Senda .................... 700/175 |

FOREIGN PATENT DOCUMENTS

| | | |
|---|---|---|
| TW | 320588 | 11/1997 |
| TW | 200617800 | 6/2006 |
| TW | 200622928 | 7/2006 |
| TW | 200625199 | 7/2006 |

OTHER PUBLICATIONS

Zhu et al., Robust Machine Tool Thermal Error Modeling Through Thermal Mode Concept, Journal of Manufacturing Science and Eng., Oct. 10, 2008.*

Chin-Hao Lo, Jingxia Yuan, and Jun Ni, "An application of real-time error compensation on a turning center", Feb. 23, 2000, 2 pages, S. M. Wu Manufacturing Research Center, College of Engineering, The University of Michigan, Ann Arbor, MI 48109-2125, U.S.A.

* cited by examiner

THERMAL ERROR COMPENSATION METHOD FOR MACHINE TOOLS

FIELD OF THE INVENTION

The present invention relates to a thermal error compensation method for machine tools, and more particularly, to a method capable of taking the geometrical structure and the material of a machine tool into consideration for calculating thermal error compensation values of the machine tool by the use of a heat conducting calculation unit and an error compensation unit.

BACKGROUND OF THE INVENTION

In precision machinery processing, machine tool thermal error is the major factor to cause workpiece's error. Thus, how to control machine tool thermal error becomes essential technique to increase the processing precision and was and still is the key issue of precision machinery development ever since 1960s. The reduction of thermal error in machine tools for the purpose of processing precision and stability improvement is mostly approached by the development of a systematic logical machine tool design or a thermal error compensation method. Nevertheless, despite that the machine tool thermal error had been studied by experts all over the world for more than half a century, the affection of temperature variation upon machining precision is still very significant in modern micro-machinery industry, especially in the applications of precision molding, bio products, consumer electronics, and so on. Therefore, for precision machining process in modern industry, it is essential to have an effective and reliable technique designed for eliminating the thermal variation problem.

There are a variety of machine tools, such as machining center, precision drilling & tapping machine, sawing machine, lathe, electrical discharge machine, milling machine, grinding machine, drilling machine, tapping machine, welding/cutting machine, punching machine, bending machine, metal working machine, and the peripherals thereof. Generally, machine tools can be affected by two kinds of heat sources, which are the external heat sources and internal heat sources. The external heat sources refer to those temperature variations caused by the ambient environment or by human operations; and the internal heat sources refer to those temperature variations caused by heat generated from the machine tools' operation, which includes heat from each axial motors, the spindle, the cooling system, or movement interfaces such as the ball screw or guiding rail systems, in machine tools. Nevertheless, it doesn't matter whether the heat is from an external heat source or an internal heat source, it will be transmitted by conduction, convection, or radiation and thus changes the machine tool's thermal state. As soon as the thermal state of a machine tool is affected and changed by a heat source, it is more than possible that a certain displacement between the cutting tool tip and workpiece will be caused which is then being referred as thermal error. As noted from previous studies that there are about 40% to 70% of machining error is contributed by thermal error, thermal error is indeed the key factor for machining precision. Generally, the thermal error in machine tools is responded and handled either by means of passive compensation or by means of active suppression. In the passive compensation means, the thermal error is compensated by the calculation of a software established in a thermal error prediction model of the machine tool; and in the active suppression, the generation of the thermal error is considered in the design phase of the machine tool for minimizing or controlling the generation of thermal error. In general, comparing with the means of active suppression, the means of passive compensation is more convenient and cost effective to be put into practice. The passive compensation means had already been adopted by machine tool manufacturers, such as Mazak (Japan), Okuma (Japan), and Mikron (Swiss), etc. Therefore, the machine tool manufacturers are redirecting and focusing their long-term effort in the development of more accurate and more reliable thermal error compensation method.

There are already many studies relating to the thermal error compensation. One of which is a real-time thermal error compensation method for machine tools disclosed in "An application of real-time error compensation on a turning center", International Journal of Machine Tools and Manufacture, 35 (12), 1995, pages 1669-1682. The method applies the information detected from the machine tool relating to temperatures, axial positions and cutting tools into an error model pre-established in the machine tool for calculating displacement prediction values and then enabling a controller of the machine tool to perform a compensation operation according to the displacement prediction values. In order to understand the thermal profile of whole machine tool, the aforesaid real-time thermal error compensation method deploys eighty thermal sensors on the machine tool for gathering temperature variation information. After analyzing the information gathered from several experiments using the eighty thermal sensors in the machine tool, the amount of thermal sensor required in any actual applications can be reduced. The aforesaid study clearly illustrates that the development of thermal error compensation technique must rely on the complete and thorough temperature variation information detected about a machine tool since it is the only way to acquire sufficient information for establishing an accurate thermal error model of the machine tool. However, since the aforesaid method requires to layout eighty thermal sensors on a machine tool, not only such large amount of thermal sensors is not easy to be deployed, but also the operation cost of the aforesaid method is increased and thus the method may not be feasible.

Another such study is a thermal error compensation device disclosed in TW Pat. No. M290082. The aforesaid thermal error compensation device for a machine tool comprises: a plurality of thermal sensors, mounted on a machine tool at positions relating to the heat sources of the machine tool; a memory card, for registering temperature information obtained by the plural thermal sensors; and a controller, configured with a macro program unit and a programmable logic control unit, for monitoring the temperature variation caused by the operations of the spindle and feed-driving system of the machine tool while performing a calculation and thus obtaining a thermal error compensation for improving the machining precision of the machine tool. It is noted that the thermal error compensation device and method claimed in the aforesaid TW patent are designed to operate similar to the previous disclosed real-time thermal error compensation method as both use signals detected from sensors on a machine tool as input to an embedded program of the machine tool for calculating thermal error compensation values. Thus, the performance of the aforesaid thermal error compensation device is highly dependent upon the completeness and thoroughness of the temperature variation information detected by sensors about a machine tool, i.e. it is highly dependent upon the layout of the plural thermal sensors. As the temperature information relating to the areas of the machine tool that are not attached by thermal sensors will not be gathered for analysis, the performance of the aforesaid device is overly rely on how much the thermal sensors are disposed on a machine tool and how those thermal sensors are distributed as well.

Yet, another such study is a control system for compensating thermal error of a machine tool disclosed in TW Pat. Pub. No. 200812746. Operationally, the control system, being adapted for controlling a machine tool, uses a software embedded in its macro program unit to gather information relating to the spindle rotation speed of the machine tool while using the gathered information as the base for calculating a compensation value, i.e. the macro program unit is enabled to use an artificial intelligent algorithm embedded therein to select a compensation equation according to the classification of the spindle rotation speed of the machine while using the selected compensation equation to obtain a compensation value. Moreover, the compensation value is resolved according to the minimum increment of the control system so as to obtain a compensation value with high resolution. With the so-obtained compensation value of high resolution, the control system is able to compensate the thermal error of the machine tool in a more precise manner as the control system is able to control the machine tool to move more precisely. It is noted that the aforesaid control system must be provided a reference database including information relating to the machine tool while its spindle is rotating at different speed and information relating to the minimum increment of the machine tool. However, the aforesaid control system is unable to response to the thermal error caused by the interaction between different internal heat sources in a machine tool as the distribution of the internal heat sources of the machine tool can be varied with the changing of feed-driving condition of the machine tool.

Yet, another such study is disclosed in U.S. Pat. No. 6,167,634, entitled "Measurement and compensation system for thermal errors in machine tools". In the aforesaid U.S. patent, a module is provided to compensate thermal errors of the machine tool. The module comprises an operating part, a data bank, an analog to digital converter, a counter and a digital input/output part. The data bank stores in all the coefficients applied to a thermal error modeling equation which governs a relation between temperatures and thermal errors at various operating conditions. The operating part determines all the coefficients of the thermal error modeling equation which are stored in the data bank and calculates the thermal errors corresponding to the temperatures of a plurality of the thermocouples by the temperatures of a plurality of thermocouples inputted from the A/D converter and the positional coordinates of the bed inputted from the counter. Then, digital data of the calculated thermal errors are inputted into the digital input/output part and the digital input/output part converts the digital data to digital signal to input the digital signals into the controller. A controller orders the machine tool to compensate the thermal errors at the positional coordinates of the bed and the feed of the spindle. It is noted that the temperature and the error of the spindle of the machine tool is measured by the use of nine thermal sensors and five capacitance displacement transducers while the resulting measurement is provided for establishing a thermal error model. As for the measurement of the feed-driving system of the machine tool, it is detected by the use of twelve thermal sensors and a laser interferometer, and thereby, a database having information relating to machine tool operating under different feed-driving conditions can be established. Accordingly, the precision of compensation is improved by the aforesaid patent since it not only considers the thermal errors caused by different spindle speed, but also those caused under different feed-driving conditions. However, similarly to the previous-described prior arts, the precision of the compensation system in this U.S. patent still highly rely on how the thermal sensors is distributed on the machine tool, and moreover, it is not considering the affection of the machine tool's geometrical structure, the relative positions of the components in the machine tool, and the interaction between heat sources of the machine tool, and so on. Thus, the aforesaid compensation system is suitable for the machining environment similar to the experimental environment provided in this U.S. patent, so that its reliability is greatly reduced when the machining environment is different from the experimental environment.

From the above description, it is noted that the prior-art thermal compensation method comprises primarily the following three steps, which are:

(1) using thermal sensors to detect the heat sources of a machine tool while measuring the corresponding temperature variation;

(2) establishing a thermal error compensation model by the use of a statistical means while using the same to convert the detected temperature variations at different positions into thermal error compensation values; and (3) enabling a controller to perform a thermal error compensation operation according to the thermal error compensation values.

However, the aforesaid prior arts have the following shortcomings:

(1) lacking the physical information relating to the integral structure of a machine tool, because of that the thermal error model can not response to the affection resulting from the geometrical shape and material of the machine tool since the prior arts only use the temperature information detected from the significant nodes on the machine tool to establish its thermal error model while the greater part of the thermal error of a machine tool is resulting from the affection of temperature variation upon the integral structure of the machine tool;

(2) not considering the interaction between heat sources of a machine tool, that is because that the relative positions of the heat sources on a machine tool can be varied with the changing of feed-driving condition of the machine tool, and thus the thermal error caused by the interaction between heat sources whose positions are not fixed may be a difficult task since there may be different thermal errors even when the prior arts detect the same temperature information which can only be prevented in the prior art by a large number of experiments for achieving an optimal distribution of thermal sensors;

(3) only providing a limited amount of temperature information for the thermal error model, because of that the precision and reliability of the thermal error model can be greatly affected by the layout of the thermal sensors as the parameters required for calculating the thermal error compensation values in the thermal error model are gathered and based upon temperatures detected from those thermal sensors distributed on a machine tool, so that the more sensors used, the more precise understanding regarding to the overall temperature information of a machine tool will have, but with increasing cost;

(4) achieving a thermal error model of poor precision and reliability, which is directly consequent from the aforesaid three shortcomings.

SUMMARY OF THE INVENTION

The object of the present invention is to provide a thermal error compensation method for machine tools, capable of taking the geometrical structure and the material of a machine tool into consideration for calculating thermal error compensation values for a machine tool, by that the information relating to the integral structural response of a machine to temperature variation can be obtained basing upon heat sources' temperature detection performed on the machine tool and thus the thermal error model established in the invention can be provided with sufficient information for enabling the same to calculate a precise and reliable thermal error values to be used for improving the machining precision of the machine tool.

To achieve the above object, the present invention provides a thermal error compensation method for machine tools, comprising the steps of: disposing at least a thermal sensor at positions neighboring to the at least one heat source of a machine tool; driving the machine tool to operate under a specific operation condition for enabling the at least one heat source to generate heat; generating a thermal signal according to the temperature detected by the at least one thermal sensor; using a heat conducting calculation unit to access the thermal signal and the information relating to the specific operation condition to be used in a calculation for obtaining and thus outputting at least a node temperature; and using an error compensation unit to access the at least one node temperature to be used in a calculation for obtaining thermal error compensation values for the machine tool.

Further scope of the applicability of the present application will become more apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below and the accompanying drawings which are given by way of illustration only, and thus are not limitative of the present invention and wherein.

DESCRIPTION OF THE EXEMPLARY EMBODIMENTS

For your esteemed members of reviewing committee to further understand and recognize the fulfilled functions and structural characteristics of the invention, several exemplary embodiments cooperating with detailed description are presented as the follows.

Figure 1:
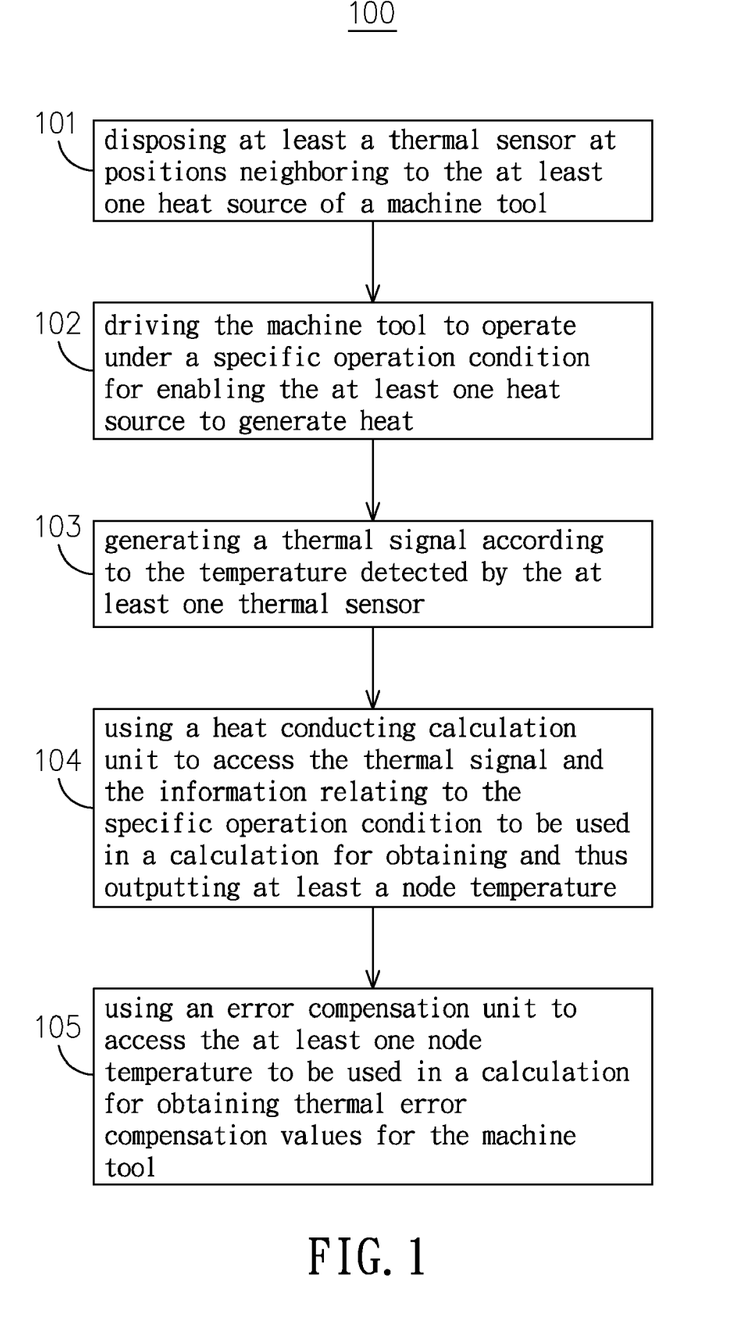
FIG. 1 is a flow chart depicting the steps of a thermal error compensation method for machine tools according to the present invention.
Figure 2:
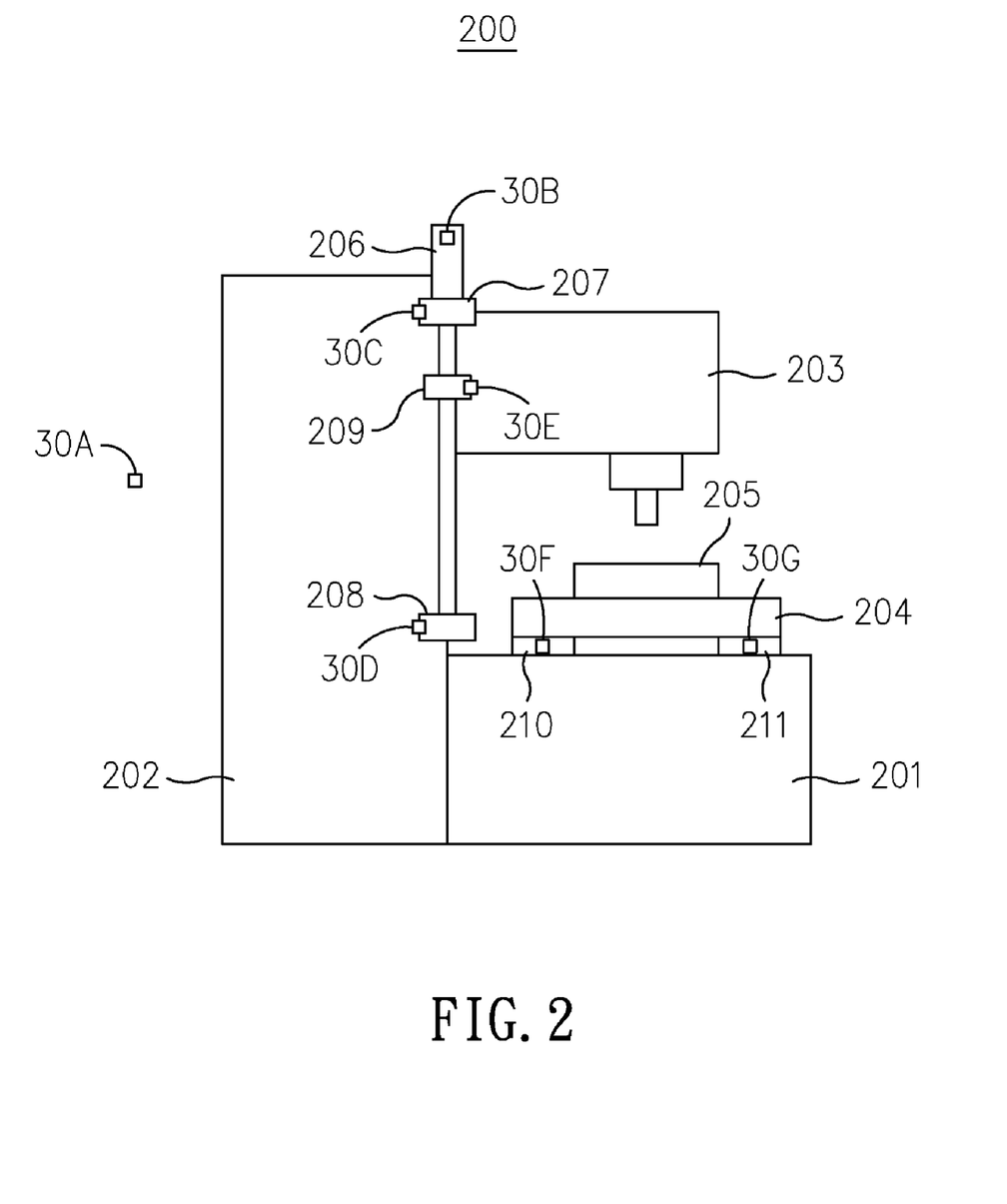
FIG. 2 is a schematic diagram showing how and where the thermal sensors are disposed on a machine tool according to an embodiment of the present invention.

Please refer to FIG. 1, which is a flow chart depicting the steps of a thermal error compensation method for machine tools according to the present invention. As shown in FIG. 1, the thermal error compensation method for machine tools 100 of the invention starts from the step 101. At step 101, there is at least a thermal sensor being disposed at positions neighboring to the at least one heat source of a machine tool; and then the flow proceeds to step 102. As shown in FIG. 2, the machine tool 200, being composed of a base 201, a column 202, a spindle headstock 203, a saddle 204 and a table 205, has thermal sensors, e.g. 30A~30G, mounted thereon at positions neighboring to its heat sources in respective. Generally, the distribution of heat sources on any machine tool is not definite, but they are mostly referred to the positions on the machine tool where going to generate heat during operation, such as spindle, servo motors, bearings, nuts, sliding blocks, and so on, which are moving parts that are going to nib against other components during the operation of the machine tool. In addition, the heat source for a machine tool can be those disposed in the ambient environment that affects the temperature variation of the machine tool. Thus, in the embodiment shown in FIG. 2, the thermal sensor 30A is placed in the ambient environment external to the machine tool 200; the thermal sensor 30B is attached to the axial servo motor 206 of the machine tool 200; the thermal sensor 30C is attached to the front bearing 207 in the driving mechanism of the machine tool 200; the thermal sensor 30D is attached to the rear bearing 208 in the driving mechanism of the machine tool 200; the thermal sensor 30E is attached to the nut 209 in the driving mechanism of the machine tool 200; and the thermal sensors 30F, 30G are attached respective to two sliding blocks 210, 211 that are moving linearly relative to the base 201. It is noted that after the thermal sensors, e.g. 30A~30G, are in place, the flow proceeds to step 102.

At step 102, the machine tool 200 is enabled to operate under a specific operation condition for enabling the at least one heat source thereof to generate heat; and then the flow proceeds to step 103. It is noted that the heat being generated by each heat source of the machine tool is going to vary with the varying of the operation condition as the operation condition includes the feed-driving speed of the machine tool 200, and the positioning of each axes of the machine tool, etc.

At step 103, thermal signals are generated according to the temperature detected by the thermal sensors 30A~30G, and then the flow proceeds to step 104. At step 104, a heat conducting calculation unit is used to access the thermal signal and the information relating to the specific operation condition of the machine tool 200 to be used in a calculation for obtaining and thus outputting at least a node temperature; and then the flow proceeds to step 105. It is noted that the heat conducting calculation unit has a finite element structural model of the machine tool 200 registered therein, which includes parameters relating to the geometrical structure and the material of the machine tool 200, etc.

Figure 3:
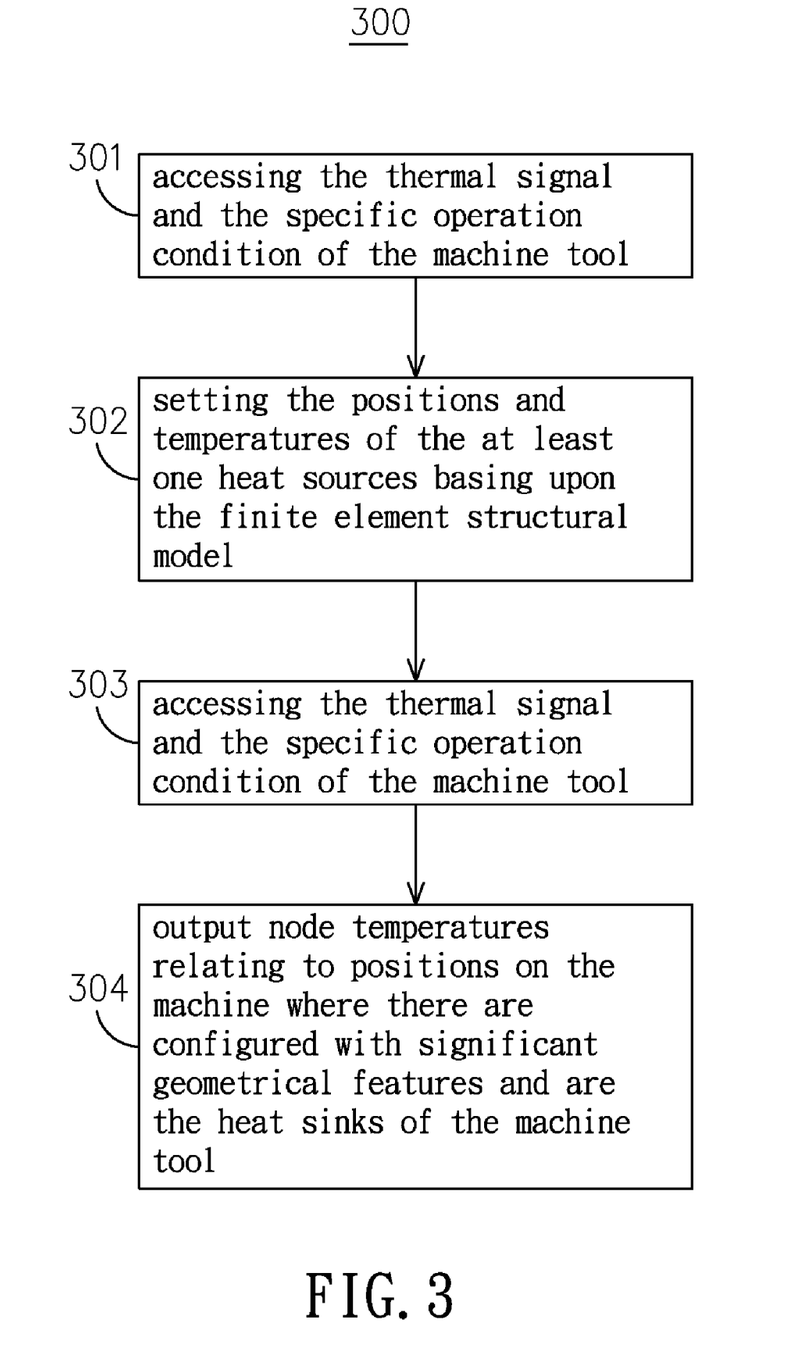
FIG. 3 is a flow chart depicting the steps performed in a heat conducting calculation unit of the invention.

Please refer to FIG. 3, which is a flow chart depicting the steps performed in a heat conducting calculation unit of the invention. As shown in FIG. 3, the calculation performed in the heat conducting calculation unit for obtaining the at least one node temperature comprises the steps of:

Step 301: accessing the thermal signal and the specific operation condition of the machine tool;

Step 302: setting the positions and temperatures of the at least one heat sources basing upon the finite element structural model;

Step 303: calculating the temperature distribution relating to the heat transfer in the structure of the machine tool; and Step 304: output node temperatures relating to positions on the machine tool 200 where there are configured with significant geometrical features and are the heat sinks of the machine tool.

Figure 4:
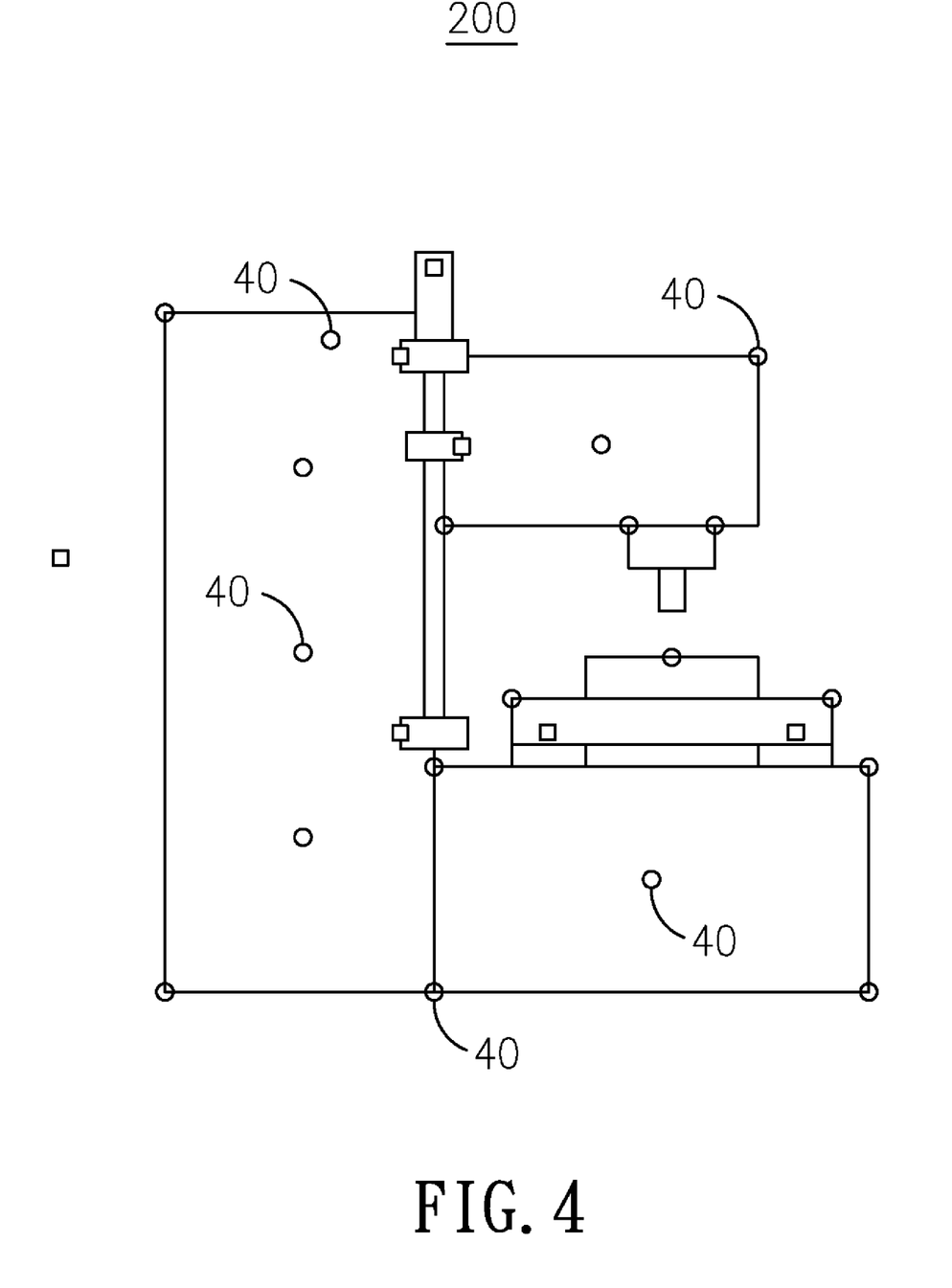
FIG. 4 is a schematic diagram showing the locations of nodes resulting from the calculation of a heat conducting calculation unit of the invention.

From the steps shown in FIG. 3, it is known that the heat conducting calculation unit is able to perform a structural heat conduction calculation using information including the thermal signals, the operation condition of the machine tool and the finite element structural model of the machine tool, for constructing a temperature distribution profile for each component of the machine tool 200, and thus obtain the at least one node temperature of the machine tool 200. Please refer to FIG. 4, which is a schematic diagram showing the locations of nodes resulting from the calculation of a heat conducting calculation unit of the invention. In FIG. 4, the dots are the node positions 40 of the machine tool 200 which are defined by the calculation of the heat conducting calculation unit as those locations where there are significant geometrical features and are acting as the heat sinks of the machine tool 200. It is noted that as different operation will cause different thermal signal and different finite element structural model of the machine tool as well, the amount of node, the positions of the nodes and also the node temperatures of the machine tool 200 obtained from the calculation of the heat conducting calculation unit will be varied with the variation of its operation condition.

Moreover, as the thermal signals generated by the thermal sensors 30A~30G are analog signals, they should be fed to an analog-to-digital converter for converting the same into digital signals and then those digital signals can be sent to the heat conducting calculation unit for processing.

Back to FIG. 1, at step 105, an error compensation unit is used to access the at least one node temperature to be used in a calculation for obtaining thermal error compensation values for the machine tool. The error compensation unit is embedded with a thermal error compensation model database and the thermal error compensation model database being established from various experimental data is a database of functions capable of describing the relationships between temperature and thermal error of the machine tool when the machine is operating under different operation conditions. In addition, common statistical means are used in the database for describing the relationships between temperature and thermal error of the machine tool, which includes the multi-variable regression analysis, the artificial neural network, and so on.

Figure 5:
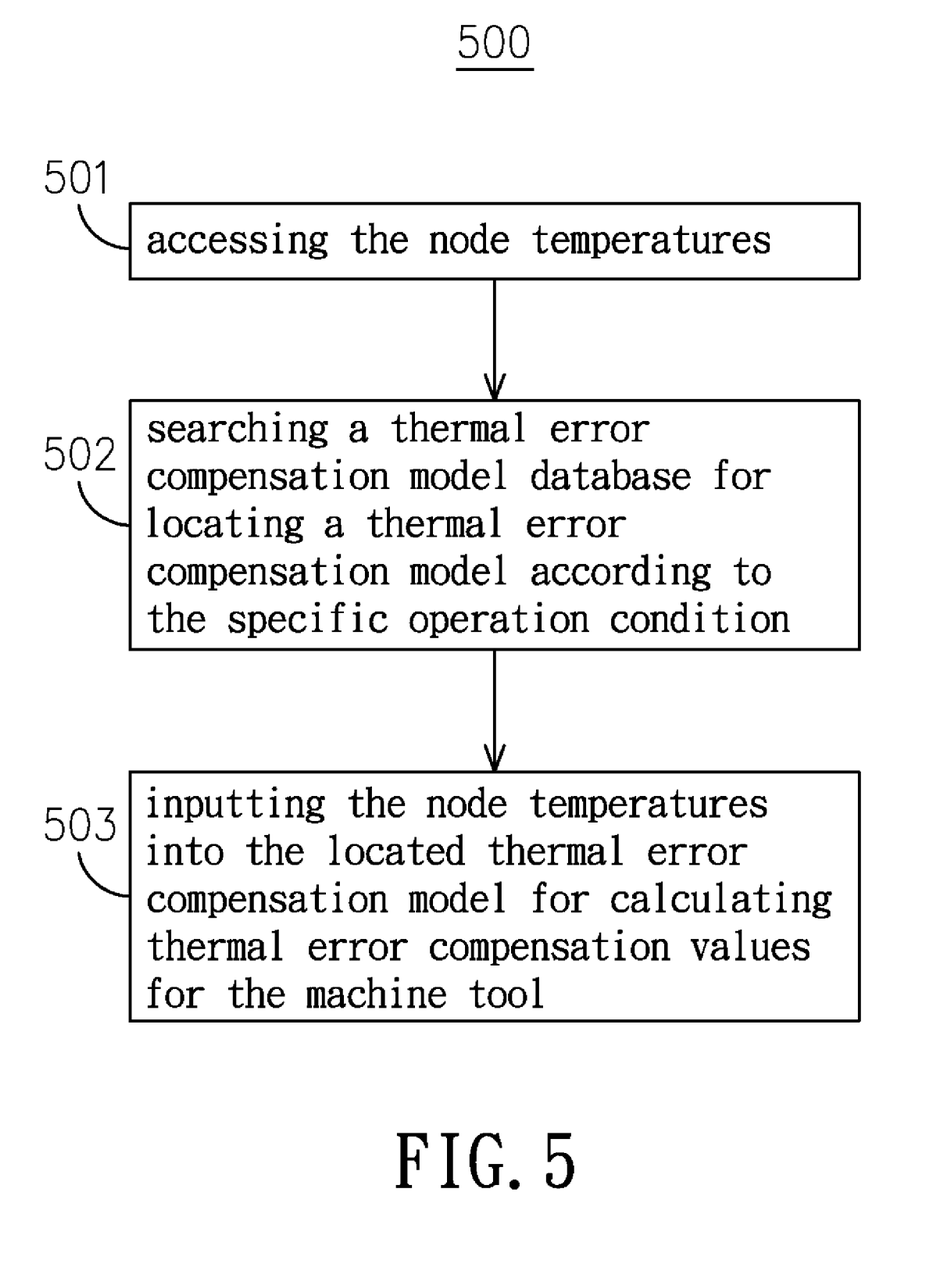
FIG. 5 is a flow chart depicting the steps performed in an error compensation unit of the invention.

Please refer to FIG. 5, which is a flow chart depicting the steps performed in an error compensation unit of the invention. As shown in FIG. 5, the calculation for obtaining the thermal error compensation values performed by the error compensation unit comprises the steps of:

Step 501: accessing the node temperatures;
Step 502: searching a thermal error compensation model database for locating a thermal error compensation model according to the specific operation condition; and
Step 503: inputting the node temperatures into the located thermal error compensation model for calculating thermal error compensation values for the machine tool.

Moreover, the machine tool 200 is configured with a controller, capable of compensating the machining of the machine tool according to the thermal error compensation values obtained from the aforesaid step 503.

To sum up, the present invention provides a thermal error compensation method for machine tools, capable of taking the geometrical structure and the material of a machine tool into consideration for calculating thermal error compensation values for a machine tool, by that the information relating to the integral structural response of a machine to temperature variation can be obtained basing upon heat sources' temperature detection performed on the machine tool and thus the thermal error model established in the invention can be provided with sufficient information for enabling the same to calculate precise and reliable thermal error values to be used for improving the machining precision of the machine tool. In addition, the method of the present invention can be applied in various machine tools including machining center, precision drilling & tapping machine, sawing machine, lathe, electrical discharge machine, milling machine, grinding machine, drilling machine, tapping machine, welding/cutting machine, punching machine, bending machine, metal working machine, and the peripherals thereof.

From the above description, it is noted that the present invention has the following advantages:

(1) The physical information including the geometrical structure of the machine tool is taken into consideration for compensating thermal errors. That is, a finite element structural model of a machine tool is being constructed at the designing stage of the machine tool by introducing parameters relating to the geometrical shape and materials of the machine tool into its CAD model, by that the information required for performing a precision thermal error calculation is comparatively much more sufficient than those prior arts.

(2) The thermal sensors can be deployed in the neighborhood of heat sources, that it can save the trouble of performing a large number of experiments for achieving an optimal distribution of thermal sensors as well as determining the amount of thermal sensors required to be deployed.

(3) The thermal error compensation of the invention also considers the temperature distribution relating to how the heat is transferred in the structure of the machine tool by feeding the detected thermal signals into the finite element structural model of the machine tool for acquiring the temperature distribution profile regarding to the overall structure of the machine tool.

(4) By the calculation of the heat conducting calculation unit, temperature information relating to those locations where there are significant geometrical features and are acting as the heat sinks of the machine tool can be obtained, using that the information required for establishing a thermal error compensation model as well as the operation thereof are comparatively much more sufficient than those prior arts.

(5) As the temperature distribution relating to the overall structure of the machine tool is fully understood in the method of the present invention, the precision and reliability of the thermal error compensation model is greatly enhanced.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

What is claimed is:

1. A thermal error compensation method for machine tools, comprising the steps of:
    disposing at least one thermal sensor at positions neighboring to at least one heat source of a machine tool;

driving the machine tool to operate under a specific operation condition for enabling the at least one heat source to generate heat;

generating a thermal signal according to a temperature detected by the at least one thermal sensor; using a heat conducting calculation unit to access the thermal signal and information relating to the specific operation condition to be used in a calculation for obtaining and thus outputting at least one node temperature; and using an error compensation unit to access the at least one node temperature to be used in a calculation for obtaining thermal error compensation values for the machine tool:

wherein the heat conducting calculation unit has a finite element structural model of the machine tool registered therein;

wherein a calculation performed by the heat conducting calculation unit for obtaining the at least one node temperature comprises the steps of:

accessing the thermal signal and the specific operation condition of the machine tool;

setting positions and temperatures of the at least one heat source based upon the finite element structural model:

calculating a temperature distribution relating to heat transfer in a structure of the machine tool; and outputting node temperatures relating to positions on the machine tool which are configured with geometrical features and are heat sinks of the machine tool.

2. The method of claim 1, wherein the thermal signal is an analog signal, and the analog thermal signal is designed to be received by an analog to digital converter where it is converted into a digital signal to be received by the heat conducting calculation unit.

3. The method of claim 1, wherein the finite element structural model includes parameters relating to the geometrical structure and material of the machine tool.

4. The method of claim 1, wherein the error compensation unit is embedded with a thermal error compensation model database and the thermal error compensation model database being established from various experimental data is a database of functions capable of describing relationships between temperature and thermal error of the machine tool when the machine is operating under different operation conditions.

5. The method of claim 4, wherein the calculation for obtaining the thermal error compensation values performed by the error compensation unit comprises the steps of:

accessing the node temperatures;

searching the thermal error compensation model database for locating a thermal error compensation model according to the specific operation condition; and inputting the node temperatures into the located thermal error compensation model for calculating thermal error compensation values for the machine tool.

6. The method of claim 4, capable of using statistical means including multi-variable regression analysis and artificial neural network for describing the relationships between temperature and thermal error of the machine tool.

7. The method of claim 1, wherein the at least one heat source of the machine tool is a location on the machine tool engaging/corresponding to its ambient environment, spindle, servo, servo motors, bearings, units, nuts, sliding blocks, and other modular identifiable components.

8. The method of claim 1, wherein the machine tool is configured with a controller, capable of compensating a machining of the machine tool according to the thermal error compensation values.

* * * * *